United States Patent [19]
Fest et al.

[11] 3,723,456
[45] Mar. 27, 1973

[54] PYRAZOLO-(THIONO)PHOSPHORIC(PHOSPHONIC) ACID ESTERS

[75] Inventors: Christa Fest, Wuppertal-Elberfeld; Ingeborg Hammann, Cologne, both of Germany

[73] Assignee: Farbenfabriken Bayer Aktiengesellschaft, Leverkusen, Germany

[22] Filed: Oct. 1, 1971

[21] Appl. No.: 185,811

[30] Foreign Application Priority Data

Oct. 9, 1970 Germany..................P 20 49 692.8

[52] U.S. Cl..............................260/310 R, 424/200
[51] Int. Cl............C07f 9/08, C07f 9/16, C07f 9/40
[58] Field of Search..................................260/310 R

[56] References Cited

UNITED STATES PATENTS

| | | | |
|---|---|---|---|
| 2,681,915 | 6/1954 | Gysin et al. | 260/310 R |
| 2,754,244 | 7/1956 | Gysin et al. | 260/310 R |
| 3,216,894 | 11/1965 | Lorenz et al. | 260/310 R |
| 3,308,130 | 3/1967 | Bousquet | 260/310 R |
| 3,452,043 | 6/1969 | Grauer et al. | 260/310 R |

OTHER PUBLICATIONS

Sauli, Chem. Abst. Vol. 73, No. 98942p (1970) QD1.451

*Primary Examiner*—Natalie Trousof
*Attorney*—Burgess, Dinklage & Sprung

[57] ABSTRACT

Pyrazolo-(thiono)phosphoric(phosphonic) acid esters of the general formula

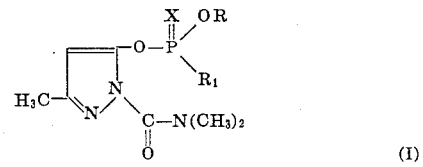

(I)

in which
  R is an alkyl radical with one to six carbon atoms,
  $R_1$ is an alkyl or alkoxy radical with one to six carbon atoms or a phenyl radical, and
  X is oxygen or sulfur,
which possess insecticidal, acaricidal and rodenticidal properties.

7 Claims, No Drawings

PYRAZOLO-(THIONO)PHOSPHORIC(PHOSPHONIC) ACID ESTERS

The present invention relates to and has for its objects the provision of particular new pyrazolo-(thiono)phosphoric(phosphonic)acid esters, i.e., O,O-dialkyl-O-[-1-N,N-dimethylcarbamyl-3-methyl pyrazol(5)yl]-phosphonic acid esters, their O-alkyl-alkane-or benzene-phosphonic acid ester analogues and the corresponding thiono compounds, which possess insecticidal, acaricidal and rodenticidal properties, active compositions in the form of mixtures of such compounds with solid and liquid dispersible carrier vehicles, and method for producing such compounds and for using such compounds in a new way especially for combating pests, e.g., insects, acarids and rodents, especially insects and acarids, with other and further objects becoming apparent from a study of the within specification and accompanying examples.

From U. S. Pat. No. 2,754,244 it is known that methylpyrazolo-(thiono)phosphoric acid esters, such as O,O-diethyl-O-[3-methylpyrazol(5)yl]-thionophosphoric acid ester (Compound A), possess insecticidal and acaricidal properties.

The present invention provides, as new compounds, the pyrazolo-(thiono)phosphoric(phosphonic) acid esters of the general formula

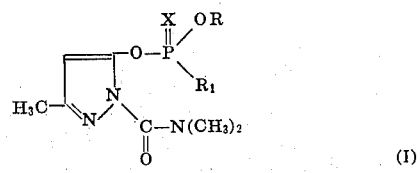

(I)

in which

R is an alkyl radical with one to six carbon atoms, $R_1$ is an alkyl or alkoxy radical with one to six carbon atoms or a phenyl radical, and X is oxygen or sulfur.

These new compounds have been found to exhibit strong insecticidal and acaricidal, e.g., tickicidal, properties, as well as, in some cases, rodenticidal activity.

The present invention also provides a process for the preparation of a compound of the formula (1) above, in which 3-methylpyrazolone-(5) of the formula

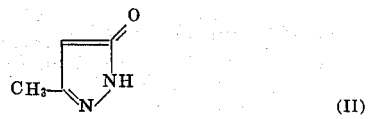

(II)

is reacted, in the form of an alkali metal, alkaline earth metal or ammonium salt thereof or in the presence of an acid-binding agent, with a (thiono)phosphoric(phosphonic) acid ester halide of the general formula

(III)

in which

R, $R_1$ and X have the meanings stated above, and

Hal denotes a halogen atom, preferably a chlorine atom, the product then being reacted with N,N-dimethylcarbamic acid chloride in the presence of an acid-binding agent.

Surprisingly, the pyrazolo-(thiono)phosphoric(phosphonic) acid esters according to the invention are distinguished by a considerably better insecticidal and acaricidal activity than the known methyl-pyrazolo(thiono)phosphoric acid esters of analogous constitution and of the same direction of activity. The compounds according to the invention therefore represent a genuine enrichment of the art.

If, for example, O,O-diethylthionophosphoric acid ester chloride, 3-methylpyrazolone-(5) and N,N-dimethylcarbamic acid chloride are used as starting materials, the reaction course can be represented by the following equations:

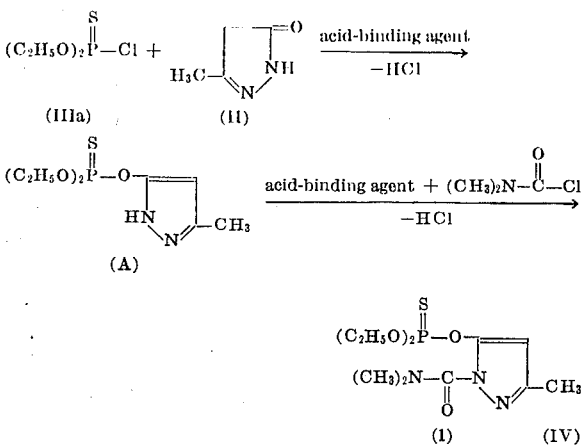

Preferably, in formula (III), as in formula (I), R and $R_1$ each denotes a lower alkyl radical with one to four carbon atoms, namely methyl, ethyl, n- or isopropyl or n-, iso-, sec.- or tert.-butyl, $R_1$ alternatively denoting a phenyl radical or a lower alkoxy radical with one to four carbon atoms, namely methoxy, ethoxy, n- or isopropoxy or n-, iso-, sec.- or tert.-butoxy.

As examples of (thiono)phosphoric(phosphonic) acid ester halides to be used in the preparative process, there are mentioned:

O,O-dimethyl-, O,O-diethyl-, O,O-dipropyl-, O,O-di-isopropyl-, O-methyl-O-ethyl-, O-methyl-O-isopropyl-, O-ethyl-O-isopropyl-, O,O-dibutyl-, O-ethyl-O-tert.-butyl and O-methyl-O-tert.-butylphosphoric acid ester chloride and the thiono analogues;
and O-methyl-methane-, O-ethyl-propane-, O-isopropyl-ethane-, O,butyl-methane, O-methyl-isopropane-, O-methyl-ethane-, O-ethyl-ethane-, O-propyl-methane-, O-butyl-ethanephosphonic acid ester chloride and the corresponding thiono compounds, as well as O-methyl-benzene-, O-ethyl-benzene-, O-propyl-benzene-, O-isopropyl-benzene and O-tert.-butyl-benzenephosphonic acid ester chloride and the thiono analogues.

The (thiono)phosphoric(phosphonic) acid ester halides, the 3-methylpyrazolone-(5) and the N,N-dimethyl-carbamic acid chloride required as starting materials are described in the literature and can be prepared according to generally known methods.

The preparative process is preferably carried out with the use of suitable solvents and diluents. As such, practically all inert organic solvents are suitable, especially aliphatic and aromatic optionally chlorinated hydrocarbons, such as benzene, toluene, xylenes, benzine, methylene chloride, chloroform, carbon tetrachloride and chlorobenzene; ethers, such as diethyl ether, dibutyl ether and dioxane; ketones, for example acetone, and methylethyl, methyl-isopropyl and methyl-isobutyl ketones; nitriles, such as acetonitrile and propionitrile; and alcohols, such as methanol, ethanol and propanol.

As acid-binding agents, all customary acid-acceptors can be used. Particularly good results have been obtained with alkali metal carbonates and alcoholates, such as sodium and potassium carbonates, methylates and ethylates, as well as with aliphatic, aromatic or hetero-cyclic amines, for example triethylamine, dimethylamine, dimethylaniline, dimethylbenzylamine and pyridine.

The reaction temperature can be varied within a fairly wide range. In general, the work is carried out at from about 0° to 100° C, preferably at from about 45° to 60° C.

The reaction is, in general, carried out at normal pressure.

For carrying out the process, the starting materials are in most cases used in equimolar amounts. An excess of one or other of the reactants brings no substantial advantages. The reaction is preferably carried out in the presence of one of the above-mentioned solvents, as well as in the presence of an acid-acceptor, within the temperature range stated, and the reaction mixture, after several hours' stirring — optionally with heating — is worked up by customary methods.

The compounds according to the invention are in most cases obtained in the form of colorless to slightly yellow-colored, viscous, water-insoluble oils which cannot be distilled without decomposition but can, by so-called "slight distillation," that is by prolonged heating to moderately elevated temperatures under reduced pressure, be freed from the last volatile components and in this way be purified. For their characterization, elemental analysis is especially suitable.

As already mentioned, the new pyrazolo(thiono)-phosphoric(phosphonic) acid esters are distinguished by an outstanding insecticidal and acaricidal effectiveness against crop pests, pests harmful to health and pests of stored products. They possess a good activity against both sucking and eating insects, and mites (Acarina), but at the same time, they exhibit only a low phytotoxicity. They also exhibit tickicidal and, in some cases, rodenticidal properties.

For these reasons, the compounds according to the invention may be used with success as pesticides in crop protection and the protection of stored goods, as well as in the hygiene and veterinary fields.

To the sucking insects contemplated herein there belong, in the main, aphids (Aphidae) such as the green peach aphid (*Myzus persicae*), the bean aphid (*Doralis fabae*), the bird cherry aphid (Rhopalosiphum padi), the pea aphid (*Macrosiphum pisi*), and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example, the beet bug (*Piesma quadrata*), the red cotton bug (*Dysdercus intermedius*), the bed bug (*Cimex lectularius*), the assassin bug (*Rhodinius prolixus*) and Chagas' bug (*Triatoma infestans*) and, further, cicadas, such as *Euscelis bilobatus* and *Nephotettix bipunctatus;* and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Trotrix viridana*), the fall armyworm (*Laphygma frugiperda*) and the cotton worm (*Prodenia litura*), the ermine moth (*Hyponomeuta padella*), the Mediterranean flour moth (*Ephestia kűhniella*) and greater wax moth (*Galleria mellonella*); and the like.

Also to be classed with the biting insects contemplated herein are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (Bruchidius = *Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example, wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta;* further, Orthoptera, for example, the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example, mosquitoes such as the yellow fever mosquito (*Aedes aegypti*), the northern house mosquito (*Culex pipiens*) and the malaria mosquito (*Anopheles stephensi*); and the like.

With the mites contemplated herein there are classed, in particular, the spider mites (Tetranychidae) such as the two-spotted spider mite (*Tetranychus telarius* = *Tetranychus althaeae* or *Tetranychus urticae*) and the European red mite (*Paratetranychus pilosus* = *Panonychus ulmi*), gall mites, for example, the black currant gall mite (*Eriophyes ribis*) and tarsonemids, for example, the broad mite (*Hemitarsonemus latus*) and the cyclamen mite (*Tarsonemus pallidus*); finally, ticks, such as the relapsing fever tick (*Ornithodorus moubata*); and the like.

When applied against pests harmful to health and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum and mineral oil fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides and rodenticides, or fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g., about 20–100 percent by weight of the active compound.

Furthermore, the present invention contemplates methods of selectively killing, combating or controlling pests, e.g., insects, acarids and rodents, and more particularly methods of combating at least one of insects and acarids, which comprises applying to at least one of correspondingly (a) such insects, (b) such acarids, (c) such rodents, and (d) the corresponding habitat thereof, i.e., the locus to be protected, a correspondingly combative or toxic amount, i.e., an insecticidally, acaricidally or rodenticidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Myzus test (contact action)

Solvent: 3 parts by weight acetone

Emulsifier: 1 part by weight alkylarylpolyglycol ether

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from the following Table 1.

TABLE 1.—(MYZUS TEST)

| Active compound | Concentration of active compound in percent | Degree of destruction in percent after 1 day |
| --- | --- | --- |
| (A) (known) | 0.1 | 99 |
| | 0.01 | 40 |
| | 0.001 | 0 |
| (2) | 0.1 | 100 |
| | 0.01 | 99 |
| (1) | 0.1 | 100 |
| | 0.01 | 98 |
| | 0.001 | 40 |
| (3) | 0.1 | 100 |
| | 0.01 | 95 |
| (4) | 0.1 | 100 |
| | 0.01 | 100 |
| (5) | 0.1 | 100 |
| | 0.01 | 100 |
| | 0.001 | 20 |

EXAMPLE 2

Tetranychus test

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100 percent means that all the spider mites are killed whereas 0 percent means that none of the spider mites are killed.

The active compounds, the concentrations of the active compounds, the evaluation times and the results can be seen from the following Table 2.

TABLE 2.—(TETRANYCHUS TEST)

| Active compound | Concentration of active compound in percent | Degree of destruction in percent after 2 days |
| --- | --- | --- |
| (A) (known) | 0.1 | 50 |
| | 0.01 | 0 |
| (2) | 0.1 | 100 |
| (1) | 0.1 | 99 |
| (4) | 0.1 | 100 |
| | 0.01 | 99 |
| (5) | 0.1 | 100 |

EXAMPLE 3

(Test with Parasitizing Fly Larvae)

Solvent: 35 parts by weight ethylenepolyglycolmonomethyl ether

Emulsifier: 35 parts by weight nonylphenol-polyglycol ether.

To produce a suitable preparation of active compound, 30 parts by weight of the active substance concerned are mixed with the stated amount of solvent containing the proportion stated above of emulsifier, and the concentrate so obtained is diluted with water to the desired concentration.

About 20 fly larvae (*Lucilia cuprina*) are put into a test-tube which contains about 2 cc of horse musculature. 0.5 ml of the preparation of active compound is applied to this horse-flesh. After 24 hours, the degree of destruction is determined as a percentage. 100 percent means that all, and 0 percent that none, of the larvae have been killed.

The test results obtained can be seen from Table 3.

EXAMPLE 4

(Tick Test)

Solvent: 35 parts by weight ethyleneglycol-monomethyl ether

Emulsifier: 35 parts by weight nonylphenol-polyglycol ether.

To produce a suitable formulation, three parts by weight of the active compound are mixed with 7 parts of the above-mentioned solvent-emulsifier mixture, and the emulsion concentrate so obtained is diluted with water to the concentration desired in each case.

Adult, gorged female ticks of the species *Boophilus microplus* (sensitive and resistant, respectively) are immersed for 1 minute in these preparations of active compound. After immersion of, in each case, 10 female specimens of the said tick species they are transferred to Petri dishes, the bottoms of which are each covered with a correspondingly large disc of filter paper.

After 10 days, the effectiveness of the preparation of active compound is determined by ascertaining the inhibition of egg deposition compared with untreated control ticks. The effect is expressed as a percentage, 100 percent denoting that eggs ceased to be deposited and 0 percent signifying that the ticks deposited eggs in the normal amount.

The active compound investigated, the concentration tried, the parasites tested and the findings obtained can be seen from the following Table 3.

TABLE 3.—(TEST WITH PARASITIZING FLY LARVAE)

| Active compound | Lucilia cuprina | | Boophilus microplus, Ridgeland strain | |
|---|---|---|---|---|
| | Concentration of active compound in p.p.m. | Degree of destruction in percent | Concentration of active compound in p.p.m. | Inhibition of egg deposition in percent |
| Compound (1) | 300<br>30 | 100<br>>50 | 10,000<br>1,000 | >50<br><50 |
| Compound (3) | 300<br>100<br>30<br>10<br>3 | 100<br>100<br><50<br><50<br><50 | 10,000 | >50 |
| Compound (4) | 300<br>30<br>3 | 100<br>>50<br><50 | 10,000<br>1,000 | 100<br>>50 |
| Compound (5) | 300<br>30 | 100<br>>50 | 10,000<br>1,000 | 100<br>>50 |
| Compound (2) | 300<br>30 | 100<br>>50 | 10,000 | 100 |

The process of the invention is illustrated in and by the following preparative Example.

EXAMPLE 5

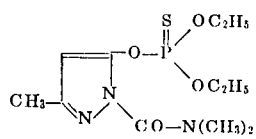

30 g (0.3 mole) of 3-methylpyrazolone-(5) are dissolved in 200 ml of acetonitrile and 30 g (0.3 mole) of triethylamine are added. At 50° C, 58 g (0.3 mole) of O,O-diethylthionophosphoric acid chloride are added dropwise to the mixture which is heated at this temperature for 5 hours and stirred for a further 10 hours at room temperature. After another addition of 30 g (0.3 mole) of triethylamine, 33 g (0.3 mole) of N,N-dimethylcarbamic acid chloride are added to the reaction mixture at 50° C; it is left at 50° C for 5 hours and afterwards stirred for a further 10 hours at room temperature. The precipitated triethylamine hydrochloride is filtered off with suction. The filtrate is washed with water and taken up in chloroform; the chloroform layer is dried over calcium chloride, the solvent is drawn off under reduced pressure, and the reaction product is slightly distilled in a high vacuum.

The yield is 60 g (62.5 percent of theory) and the refractive index $n_D^{26}$ of the product is 1.5119.

Analogously, the following compounds are prepared:

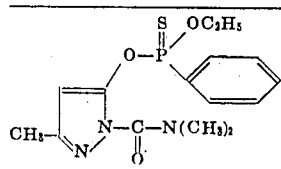

Yield: 71.5% of theory
$n_D^{25} = 1.5649$
Analysis:
Calc. for $C_{13}H_{20}N_3O_3PS$ .......................... S 9.07%
Found ....................................................... 9.17%

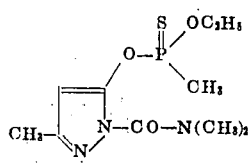

Yield: 66.5% of theory
Analysis:                                N         P
Calc. for $C_{10}H_{18}N_3O_3PS$ ............... 14.43%   10.65%
Found ................................................ 14.25%   10.21%

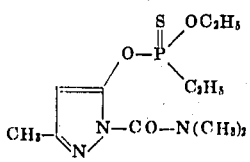

Yield: 69% of theory

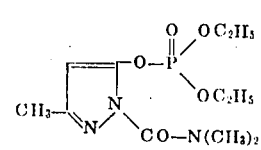

Yield: 62 percent of theory
Analysis:                    N         P
calc. for $C_{11}H_{20}N_3O_5P$    13.79%    10.17%
found                       14.21%    10.59%

It will be appreciated that the instant specification and examples are set forth by way of illustration and not limitation, and that various modifications and changes may be made without departing from the spirit and scope of the present invention.

What is claimed is:

1. A pyrazolo-(thiono)phosphoric(phosphonic) acid ester of the formula

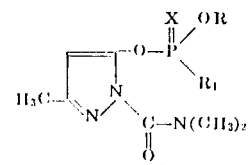

in which
R is alkyl of one to six carbon atoms,
$R_1$ is alkyl or alkoxy of one to six carbon atoms or phenyl, and
X is oxygen or sulfur.

2. A compound according to claim 1, in which R is alkyl of one to four carbon atoms, and $R_1$ is alkyl or alkoxy of one to four carbon atoms or phenyl.

3. The compound according to claim 1, wherein such compound is O,O-diethyl-O-[1-N,N-dimethylcarbamyl-3-methylpyrazol(5)yl]-phosphoric acid ester of the formula

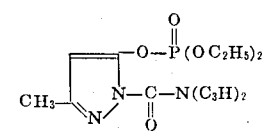

4. The compound according to claim 1, wherein such compound is O,O-diethyl-O-[1-N,N-dimethylcarbamyl-3-methylpyrazol(5)yl]-thionophosphoric acid ester of the formula

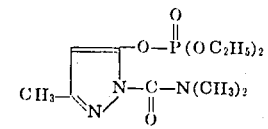

5. The compound according to claim 1, wherein such compound is O-ethyl-O-[1-N,N-dimethylcarbamyl-3-methylpyrazol(5)yl]-benzenethionophosphonic acid ester of the formula

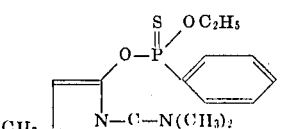

6. The compound according to claim 1, wherein such compound is O-ethyl-O-[1-N,N-dimethylcarbamyl-3-methylpyrazol(5)yl]-methanethionophosphonic acid ester of the formula

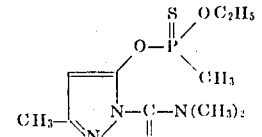

7. The compound according to claim 1, wherein such compound is O-ethyl-O-[1-N,N-dimethylcarbamyl-3-methylpyrazol(5)yl]-ethanethionophosphonic acid ester of the formula
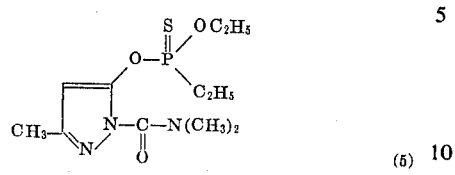
(5)
* * * * *